(12) United States Patent
Hyvönen et al.

(10) Patent No.: US 11,001,095 B2
(45) Date of Patent: May 11, 2021

(54) LAYERED STRUCTURE WITH EMBEDDED GRAPHICAL PATTERN

(71) Applicant: DOCOVER OY, Helsinki (FI)

(72) Inventors: Teppo Hyvönen, Helsinki (FI); Jari Ronkainen, Helsinki (FI); Atso Toimela, Helsinki (FI); Pusheng Peng, Guangdong (CN)

(73) Assignee: DOCOVER OY, Helsinki (FI)

( * ) Notice: Subject to any disclaimer, the term of this patent is extended or adjusted under 35 U.S.C. 154(b) by 39 days.

(21) Appl. No.: 16/335,759

(22) PCT Filed: Sep. 25, 2017

(86) PCT No.: PCT/FI2017/050671
§ 371 (c)(1),
(2) Date: Mar. 22, 2019

(87) PCT Pub. No.: WO2018/055238
PCT Pub. Date: Mar. 29, 2018

(65) Prior Publication Data
US 2019/0241013 A1    Aug. 8, 2019

(30) Foreign Application Priority Data

Sep. 23, 2016    (FI) ...................................... 20165716

(51) Int. Cl.
*B44F 1/06*    (2006.01)
*B44F 1/10*    (2006.01)
(Continued)

(52) U.S. Cl.
CPC ................ *B44F 1/066* (2013.01); *B32B 7/06* (2013.01); *B32B 7/12* (2013.01); *B32B 17/06* (2013.01);
(Continued)

(58) Field of Classification Search
CPC ..... C09D 11/322; C09D 11/06; C09D 11/037; C09D 11/36; B32B 27/365; B32B 27/308;
(Continued)

(56) References Cited

U.S. PATENT DOCUMENTS 4,303,717 A * 12/1981 Andrews ................. B44C 1/172
427/407.1
6,731,416 B2    5/2004 Hazzard
(Continued)

OTHER PUBLICATIONS

Finnish Patent and Registration Office, Search Report of Finnish Patent Application No. 20165716, dated May , 2017, 2 pages.

*Primary Examiner* — Patricia L. Nordmeyer
(74) *Attorney, Agent, or Firm* — Thomas|Horstemeyer, LLP

(57) ABSTRACT

A method is presented for producing an optically transmissive layered structure for use as a display protector for electronic devices. The method comprises printing an ink pattern on a base layer, where said base layer is substantially optically transparent, and the base layer and ink are configured so that the ink reflects light with high incidence angle and transmits light with low incidence angle, when in use, thus displaying the pattern in the absence of light with high intensity and low incidence angle, the pattern becoming substantially undetectable otherwise.

14 Claims, 2 Drawing Sheets

(51) Int. Cl.
    *C09D 11/037*     (2014.01)
    *G02B 1/14*     (2015.01)
    *B32B 17/06*     (2006.01)
    *B32B 7/06*     (2019.01)
    *B32B 7/12*     (2006.01)
    *B32B 27/08*     (2006.01)
    *C09D 11/322*     (2014.01)
    *C09D 11/36*     (2014.01)
    *B41M 3/00*     (2006.01)
    *C09D 11/06*     (2006.01)
    *H04M 1/02*     (2006.01)
    *B32B 27/30*     (2006.01)
    *B32B 27/36*     (2006.01)
    *H04B 1/3888*     (2015.01)
    *B41J 2/485*     (2006.01)

(52) U.S. Cl.
CPC ............ *B32B 17/064* (2013.01); *B32B 27/08* (2013.01); *B32B 27/306* (2013.01); *B32B 27/308* (2013.01); *B32B 27/36* (2013.01); *B32B 27/365* (2013.01); *B41M 3/00* (2013.01); *B44F 1/10* (2013.01); *C09D 11/037* (2013.01); *C09D 11/06* (2013.01); *C09D 11/322* (2013.01); *C09D 11/36* (2013.01); *G02B 1/14* (2015.01); *H04B 1/3888* (2013.01); *H04M 1/0283* (2013.01); *B32B 2255/10* (2013.01); *B32B 2255/205* (2013.01); *B32B 2264/105* (2013.01); *B32B 2307/412* (2013.01); *B32B 2307/414* (2013.01); *B32B 2307/584* (2013.01); *B32B 2307/732* (2013.01); *B32B 2451/00* (2013.01); *B41J 2/485* (2013.01); *Y10T 428/1462* (2015.01)

(58) Field of Classification Search
CPC ....... B32B 27/36; B32B 27/306; B32B 27/08; B32B 7/12; B32B 7/06; B32B 17/064; B32B 17/06; B32B 2307/584; B32B 2307/732; B32B 2307/414; B32B 2307/412; B32B 2255/10; B32B 2255/205; B32B 2264/105; B32B 2451/00; B44F 1/10; B44F 1/066; H04B 1/3888; H04M 1/0283; B41M 3/00; G02B 1/14; B41J 2/485
See application file for complete search history.

(56) References Cited

U.S. PATENT DOCUMENTS

| | | |
|---|---|---|
| 9,001,502 B1 | 4/2015 | Cowan |
| 2008/0316366 A1 | 12/2008 | Takatani et al. |
| 2011/0177300 A1 | 7/2011 | Hankey et al. |
| 2012/0033304 A1* | 2/2012 | Kim ............... G02B 5/0278 359/614 |
| 2013/0059117 A1 | 3/2013 | Hill |
| 2014/0170384 A1* | 6/2014 | Kasperchik ......... C09D 11/328 428/148 |
| 2014/0293580 A1 | 10/2014 | Kuan |
| 2014/0315003 A1* | 10/2014 | Dougase ............... B41M 1/10 428/207 |
| 2015/0286327 A1* | 10/2015 | Chakrabarti ........... G06F 3/041 359/352 |
| 2016/0085004 A1 | 3/2016 | Hamberg et al. |

\* cited by examiner

LAYERED STRUCTURE WITH EMBEDDED GRAPHICAL PATTERN

PRIORITY

This application is a U.S. national application of the international application number PCT/FI2017/050671 filed on Sep. 25, 2017 and claiming priority of the Finnish national application 20165716 filed on Sep. 23, 2016, the contents of all of which are incorporated herein by reference.

FIELD OF THE INVENTION

The invention relates to an optically transmissive multi-layered structure that can be placed on the surface of a target entity, said structure incorporating a visual design. More specifically, however not exclusively, the invention relates to such a structure for use as a display protector for electronic devices comprising a printed pattern that is, depending on the lighting conditions, for instance, more clearly visible or remain substantially undetected by a viewer.

BACKGROUND OF THE INVENTION

Transparent materials such as glass or acrylic are generally widely used in various applications. The apparent need for sufficient transparency to be maintained in many circumstances, such as in displays for electronic devices or in windows e.g. for doors, vehicles, building structures, lighting devices, and various signs, makes it difficult to utilize the surface for other purposes, for instance advertising or decorative purposes. Yet, there may also be a desire to protect these materials from damages, including scratching or cracking.

Many possibilities exist for producing an object with a visual design, such as a graphical object, which may be secured onto a target surface. Considering e.g. mobile terminals such as smartphones, tablets or phablets, a visual design with considerable aesthetic or informative value may be produced on a cover, for instance, with reference to different graphical patterns, figures, text, shapes, etc. Such objects will, however, severely interfere with transparency of the underlying surface, which will be a considerable disadvantage in cases where a certain level of transparency is nevertheless required at least intermittently for appropriate use of the surface material.

Various types of methods for producing protective layers for, e.g., displays of electronic devices are also acknowledged. E.g. a plastic film type clear overlay may be disposed upon the display. These methods in turn do not provide means for adding decorative or informative visual elements directly onto the display screen that do not severely obstruct the user's view of the display when the device and display are in use.

SUMMARY OF THE INVENTION

The present invention provides, in one embodiment, a method for producing an optically transmissive layered structure for use as a display protector for electronic devices, the method comprising printing an optically transmissive, optionally translucent or partially transparent, e.g. semi-transparent, ink pattern on a base layer, where said base layer is optically substantially transparent at desired wavelengths preferably including visible light, and laminating the pattern-hosting base layer to a protective, preferably also opti- cally correspondingly substantially transparent, layer configured to face the environment of the electronic device, when installed thereon, wherein the base layer, protective layer and ink are configured so that the ink reflects, when in use, light with higher incidence angles more effectively, thus rendering the pattern more visible in the presence of light with higher incidence angles, and transmits light with lower incidence angles more effectively, thus displaying the pattern less clearly in the presence of light with lower incidence angles and preferably higher intensity.

A method is thus provided for producing an optically transmissive layered structure for use as a display protector of a target device, optionally electronic device, the method comprising printing an optically transmissive ink pattern on a base layer, where said base layer is optically substantially transparent at predefined wavelengths preferably including visible light, and laminating the pattern-hosting base layer to a protective, preferably also optically substantially transparent, layer configured to face the environment of the electronic device, when installed thereon, wherein the base layer, protective layer and ink are configured so that the ink reflects, when in use, light with higher incidence angles more effectively than light with lower incidence angle, thus rendering the pattern more visible in the presence of light with higher incidence angles than with lower incidence angles, and transmits light with lower incidence angles more effectively than light with higher incidence angles, thus displaying the pattern less clearly in the presence of light with lower incidence angles and preferably higher intensity than in the absence thereof.

In another embodiment, an optical, optionally flexible, multilayer structure for use as a display protector for electronic devices is provided, the structure comprising a base layer, onto which an ink pattern has been provided, and a protective layer laminated thereon, where said base layer is substantially optically transparent, the base layer, protective layer and ink being configured so that said ink reflects, when in use, light with high incidence angle and transmits light with low incidence angle, thus displaying the pattern in the absence of light with high intensity and low incidence angle and presence of light with high intensity and high incidence angle, the pattern becoming substantially undetectable otherwise.

Preferably, in the above and/or other embodiments of the present invention regarding the manufacturing of a layered structure or the resulting structure itself, by the proper configuration of the included material layers including the base layer and the ink layer, the optical contrast between the other portions of the layers and the pattern is perceivable to a desired degree at lighting conditions where there is no high intensity light substantially perpendicularly incident on the structure, but less visible or practically invisible in the contrary scenario.

Preferably, in connection with an electronic target device such as a mobile terminal, the pattern is perceived to a greater amount when the display light is off (thus basically ambient light only reflecting from the pattern) but to lesser amount, most preferably not practically at all, when the relatively high, or at least higher, intensity display light is on, which is indicative of a situation where information is presented to a user of the electronic device via the display. In this situation a very visible pattern in the optical path towards the viewer could easily disturb the user or even prevent them from perceiving the displayed data.

Accordingly, e.g. the printed material, i.e. ink, may have been selected or otherwise configured (disposed, aligned, processed, etc.) to reflect, scatter, and/or absorb (convert e.g. into heat) a portion of the incident light while passing (transmitting) the rest through preferably in a substantially regular non-diffuse fashion so that the contrast between the printed area and area free from such is sufficient for perceiving the pattern when the display light is off, and non-existent or at least lower when the underlying display light is on so that the display image when shown on the (illuminated) display remains substantially sharp and non-blurred to a viewer also regarding areas having the ink pattern in the optical path towards the viewer.

The ink may comprise and be thus configured in terms of its optical and other properties via at least one constituent selected from the group consisting of: colourant (e.g. pigment or dye), vehicle, varnish, solvent, additive, silver powder, gloss oil, matt varnish oil, base oil, acrylic acid polymer, isophorone, defoamer, oil-proof agent, dispersant, and thickener.

Depending on the embodiment, the used ink may have a transmittance of e.g. about 30%, 50%, 75%, 80%, or more at desired wavelengths, preferably including visible wavelengths. The ink may be near transparent, semi-transparent or translucent, i.e. scattering/diffusive.

Likewise, reflectance (and e.g. related glossiness indicative of the amount of specular reflectance) and/or absorbance of the provided ink pattern may be generally configured as desired having regard to the target wavelengths and e.g. incidence angles. For example, with relatively small angles of incidence (the light from the underlying display (lighting) arrives at the ink more or less perpendicularly), reflectance is preferably smaller (e.g. 20% or less) than with larger angles (e.g. ambient light arriving at the ink pattern from the opposite, environment side in contrast to the target device).

For example, varnish in the ink may be configured to provide desired reflective properties to the ink. Yet, e.g. particle size of the colorant particles may be tailored. Generally, e.g. surface roughness may be further utilized to control the reflectance of the ink (increased roughness leads to reduced gloss, i.e. specular reflectance, and elevated diffuse reflectance).

Having regard to general material selections and e.g. related refractive indices of the ink and neighboring adjacent layers such as the base layer and protective layer, the selections may be made through testing and/or modeling the effect of different materials in the light of e.g. Maxwell's and Fresnel equations to find optimum relation of reflected and refracted light, i.e. a so-called sweetspot for the visibility of the shown pattern from different angles and in different lighting conditions having regard to the state and e.g. intensity of (display) lighting or ambient light.

The utility of various embodiments of the invention includes providing novel means for advertisement or producing products with a visual design that will attract customers among other potential uses. Advertisements or other visual designs, including text, may be added to target entities such as (displays of) electronic devices, or door, building, or vehicle windows or related surfaces, which require the possibility of the visual design to become essentially transparent, i.e. undetectable in some cases.

This leads to opportunities for utilizing embodiments of the invention in advertising or to produce consumer products with visual elements in an application where substantial transparency of the entity should be maintained, or where the entity itself should remain essentially visible. The visual element may be implemented in such a manner that it appears as holographic-like, meaning in this context that it will appear altered when viewed in different circumstances, for instance.

The possibility of a protective function further extends the potential applications. In some embodiments, a protective layer shields the (display of the) electronic device or other target entity from outside impact that may otherwise lead to cracking or scratching of the entity. Additionally, if an impending shock is strong enough to fracture the protective layer, the embodiment may at least retain its structure as one body and does not break into fragments which may potentially harm a user.

The method is cost-effective, straightforward, and can be implemented without the use of tailored equipment. Additional possible characteristics that extend the utility of various embodiments include considerable flexibility, lightness, and thinness of the embodiments. An embodiment according to the present invention may thus be placed on the surface of a target entity of essentially any shape, and its attachment is simple. A structure according to the invention and its target entity may also be bent to some extent without breakage of the structure.

Different further embodiments of the present invention are described hereinafter in the detailed description and dependent claims.

BRIEF DESCRIPTION OF THE DRAWINGS

The present invention will be described next in greater detail with reference to the accompanying drawings, in which.

DETAILED DESCRIPTION OF THE INVENTION

The term "light" herein refers to, but is not limited to wavelengths in the visible range of the electromagnetic spectrum.

Figure 1:
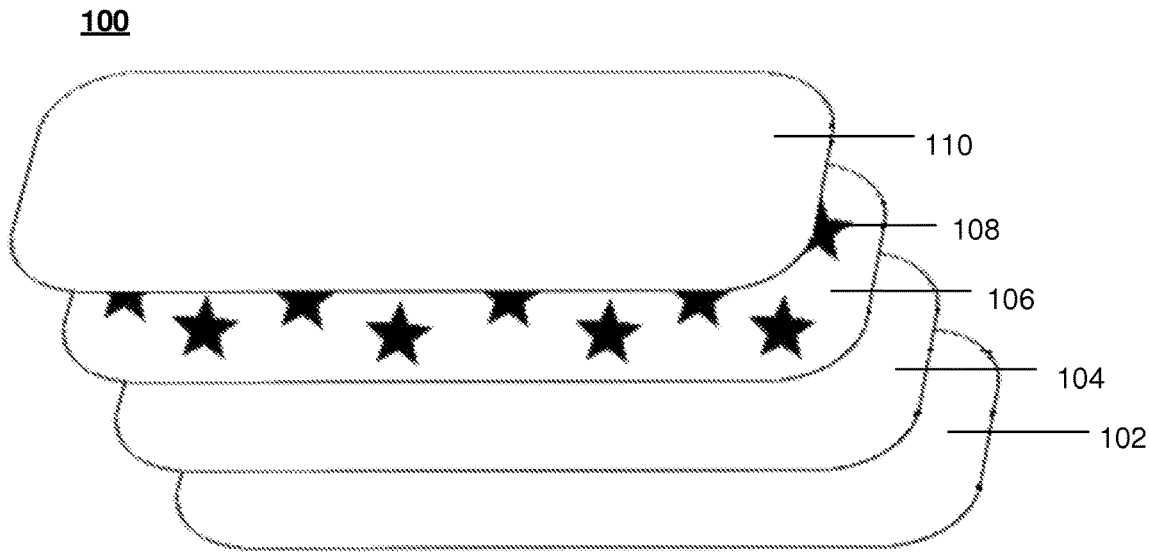
FIG. 1 illustrates the layers and their respective order in one embodiment of the present invention.

According to one embodiment of the present invention, a layered structure 100 depicted in FIG. 1 may be manufactured through integration incorporating lamination, for instance.

The embodiment comprises a disposable layer 102, an adhesive layer 104, a base layer 106, ink pattern 108, and a protective layer 110. In some embodiments, one or all of the layers 102, 104, or 110 may be excluded from the embodiment.

The disposable layer 102 may be composed of a material of choice which is convenient for the embodiment. For the embodiment of FIG. 1, for example paper or a plastic such as polyvinyl chloride or polyethylene may be used. The disposable layer 102 may basically protect the adhesive layer 104 during storage and transportation, for example.

The adhesive layer 104 may comprise any transparent adhesive, such as a multi-component adhesive, for example NB epoxy.

The base layer 106 may comprise a transparent material onto which ink may be printed and should preferably have thickness of under 0.1 mm, thus a plastic or adhesive may be used, for example. Considerable elasticity is a desirable physical quality in the base layer 106, along with adhesive properties, making a cured layer of acrylic adhesive a suitable base layer 106 in some embodiments, in which case the thickness of the base layer 106 may amount to approximately 0.05 mm.

The ink used for the ink pattern 108 can be a printable ink that, when positioned and generally configured within structure 100, generally more effectively reflects light with high incidence angle and correspondingly, more effectively transmits light with low incidence angle.

In some advantageous embodiments, the ink may comprise at least the following constituents in percent by weight ranges as follows: silver powder 15%-25%, gloss oil 20%-30%, matt varnish oil 40-50%, and/or base oil 5%-10%. This formulation may be especially advantageous in embodiments where the structure 100 is to be used as a display protector for electronic devices.

In one other embodiment, for instance PUV-110 (trade name, a UV-curable ink, available from Shenzhen dahe ink Technology Co., Ltd.), may be used as the printed ink.

In embodiments of the invention, as may be appreciated by a person skilled in the art, constituents of the ink may be tailored to obtain a formula exhibiting the desired characteristics and/or behavior with regard to the visibility of an ink pattern 108 in different lighting conditions. Alternatively or additionally, either the composition of the ink, in relation the relative amounts of its constituents, may be altered to reach the desired functionality, e.g. through a tailored viscosity, and/or a thickness or amount of the ink that is printed may be fine-tuned for the purpose.

It may be comprehended that an appropriate formulation for the used ink may be different for different use purposes. The aforementioned formulation with constituents in amounts according to the disclosed percentages may be particularly advantageous for use with a screen protector for a mobile phone. In other use scenarios, such as providing decorative structures for use with windows, the used ink may have an at least slightly differing consistency.

The protective layer 110 can be any transparent material. In some embodiments, a considerably thin (thickness under about 0.4 mm in preferred embodiments) but durable material is advantageously used, such as glass, flexible glass, polyethylene terephthalate, polycarbonate, or acrylic. A user is in preferred use cases of the structure 100 viewing it, the included pattern 108, and the target entity such as the (display of the) electronic device, which is underlying or situated behind the structure 100, from the side of the protective layer 110, i.e. from the environment. The protective layer 110 may have a substantially even, or smooth, surface.

The protective layer 110 has the prospective function of shielding the target entity from damages. These damages may, for instance, be caused by objects colliding with the target entity, which lead to breaking, scratching, or cracking of the target entity. In the case of an electronic device for example, maintaining integrity of the display is often a matter of interest for the user of the device.

Further prevention of damages to the target entity and/or a user of the entity may in some embodiments be provided by the base layer 106. The prospective physical qualities of the base layer material can aid in protection of the target entity itself, for example a base layer 106 having considerable elasticity can absorb shocks administered to the target entity, preventing its breakage. In the event of breakage of the protective layer 110 into fragments, adhesive properties of the base layer 106 may ensure that the fragments are adhered to the base layer 106 with such strength that the fragments are not separated from the rest of the embodiment, protecting a user of the embodiment and the environment from potential harm caused by the fragments.

The placement of the ink pattern 108 on the base layer 106 enables the production of a structure 100 with a visual design to be placed on the surface of a target entity. The ink that is used to print the ink pattern 108 of the structure 100 is configured to reflect light with high incidence angle and transmit light, optionally in a regular (specular) fashion, with low incidence angle, thereby rendering the ink pattern 108, depending on the lighting conditions, as either visible or considerably undetectable to the human eye. For example, the ink PUV-110 may retain the aforementioned qualities to a sufficient degree if positioned as a thin-enough layer upon the base 106.

As alluded to hereinbefore, the disposable layer 102 is provided in some embodiments in order to prevent curing and/or tarnishing of the adhesive layer 104, for example, which might inhibit the use of the embodiment, until the embodiment is to be attached to the target entity. In this case, the disposable layer 102 is detached from the rest of the embodiment at a time before the embodiment is attached to the target entity. Accordingly, the layer 102 is used during storage and transport of the structure 100 prior to actual installation thereof.

The layered structure 100 preferably has a thickness of under about 0.6 mm and the materials employed permit considerable flexibility of the structure. The aforementioned characteristics make the embodiment 100 suitable for use as a display protector for electronic devices, also for those with, for example, a curved display. Thinness and flexibility of some embodiments leads to practically no restrictions to the shape of the target entity, and the embodiment can be utilized without noticeably altering the dimensions of the target entity.

Figure 2:
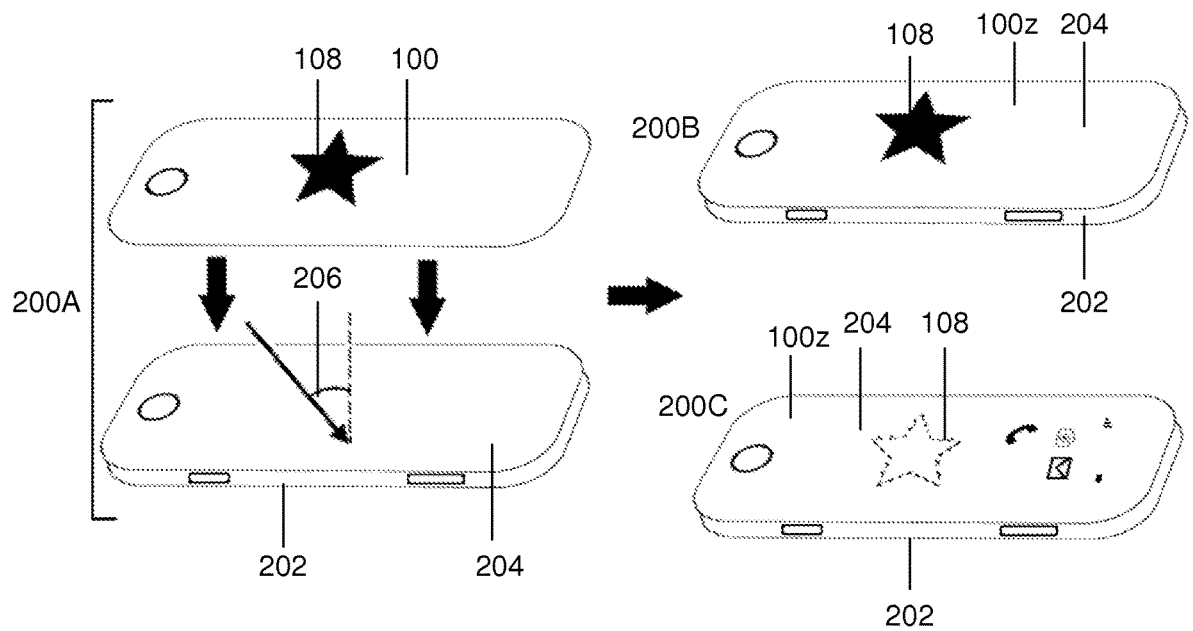
FIG. 2 depicts the use of one embodiment of the present invention.

The functional aspect of the embodiment of FIG. 1 is illustrated in FIG. 2.

200A shows the layered structure 100 and the intended target entity 202, an electronic device in this embodiment, with the display 204 facing the structure 100. The incidence angle 206 is defined as the angle between the normal of the face of the target entity (or structure 100) and light that the target entity or structure 100 is subjected to.

In 200B and 200C, the embodiment 100 after removal of the disposable layer 102, the structure now being represented by 100z, comprising of adhesive layer 104, base layer 106, ink pattern 108, and protective layer 110, has been attached to the target entity, in this case onto the display 204 of the mobile device 202. In particular, two functional modes of the resulting aggregate device are shown at 200B and 200C, respectively.

With reference to a scenario depicted at 200B, the ink pattern 108 will be visible in ambient light in the absence of (display) light with substantial intensity that is perpendicular to the face of the structure 100z. The aforementioned conditions are fulfilled in 200B, in which, in this embodiment, the ink pattern 108 is visible in daylight while the display 204 of the mobile device 202 is turned off, i.e. does not give off any light. Visual designs printed in ink can thus be seen by a user of the device 202 or other beings within appropriate visual range of the target entity. In some embodiments, the layered structure 100, 100z according to the invention has a substantial surface area, along with the target entity, submitting large audiences to the visual design.

In the scenario of 200C, the display 204 is turned on, i.e. gives off light, fulfilling the condition of providing light perpendicular to the face of the structure 100z with intensity of such magnitude that the ink pattern 108 is substantially transparent to the human eye. That is, when the display 204 is turned on, light with intensity that is substantially higher than the intensity of ambient light is present, this light also having a substantially lower incidence angle than the incidence angle of ambient light.

The ink pattern 108 becoming essentially transparent in the scenario of 200C ensures that the device 202 may be used without distraction or obstruction of the visibility of the display 204 when it is turned on. Various embodiments of the invention permit its use in circumstances where the structure 100 should retain its transparency in at least some situations.

Figure 3:
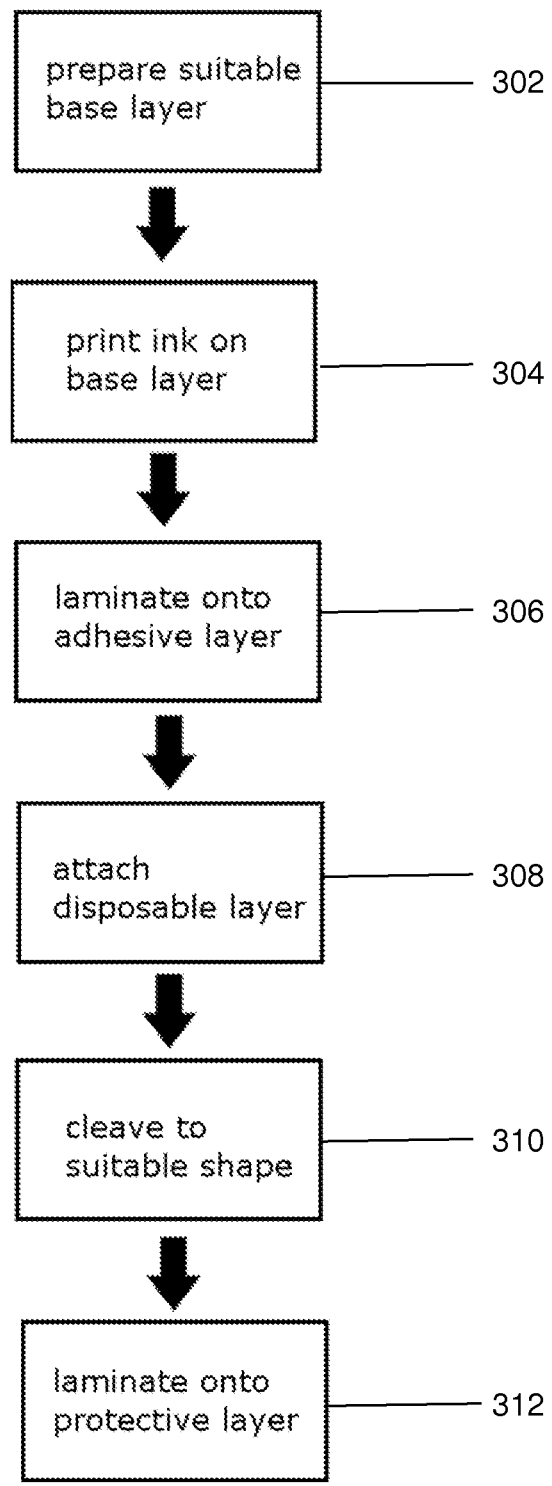
FIG. 3 shows the steps taken in a method according to an embodiment of the invention.

FIG. 3 exhibits the steps taken to produce an embodiment according to the method of the present invention, for example the embodiment of FIG. 1.

The step 302 may in some embodiments involve curing of the base layer material, for example an adhesive.

The obtained layer of adhesive such as acrylic glue may substantially have an even surface whereon an ink pattern 108 will be provided.

After a suitable base layer 106 has been obtained, the ink pattern 108 is printed onto the base layer 106 in step 304 with an applicable printing method, which may include screen, flat-bed screen, rotary screen, inkjet, or flexography type printing methods, among other options. The ink pattern 108 may be printed on either or both sides of the base layer 106, for example the side subsequently in some embodiments facing the protective layer 110 and/or the side facing the possible adhesive layer 104 in the future.

After this, the base layer 106 with the ink pattern 108 is preferably laminated onto the adhesive layer 104 in step 306, which is optionally followed by attachment of the disposable layer 102 in step 308. In some embodiments these steps may, however, be omitted or replaced with other applicable solutions.

Suitable lamination techniques in accordance with various embodiments of the present invention may involve application of an adhesive, pressure, and/or heat, for example.

In 310, the layered structure 100 that is obtained thus far is optionally cleaved to a shape that is appropriate for the embodiment in question using a convenient method for cutting, which may include die or laser cutting.

In the final step of 312, the structure 100 obtained after step 310 is laminated onto the protective layer 110, using a suitable laminating method.

The manufactured structure 100 may next be attached to a target entity, e.g. electronic device or window surface as discussed herein earlier, the disposable layer 102 (if any) being removed in advance.

When in use and attached to the target electronic device, for example, the ink will then reflect ambient light arriving at the structure 100 from the environment via the top (protective) layer 110 and pass (transmit) light arriving thereat from the opposing device (display) side, i.e. via the adhesive layer 104, preferably in a regular fashion. Reflection from the ink is preferably more efficient with larger incidence angles than with smaller incidence angles. Likewise, transmission is more efficient with more perpendicular, more collimated, light emitted by e.g. the display of the target device in this particular application.

A person skilled in the art will appreciate the fact that the execution order of previously presented method steps may be flexibly altered depending on the particular use scenario. For example, in some embodiments the lamination step 312 could be executed prior to the step 310 provided that protective layer 110 survives the associated shaping or cutting activities without breakage.

Likewise, in some embodiments the attaching step 308 of the disposable layer may be executed after item 310 and/or 312.

The duration of various process steps, those introduced above and/or other process steps possibly not explicitly incorporated herein, may vary between embodiments, depending on the used materials and/or the included material layers from very short durations in the order of magnitude of seconds to several hours, for instance. For example, in one embodiment a protective layer 110 with advantageous qualities may be obtained through a toughening or tempering process that may have a duration of about 4 hours.

The invention claimed is:

1. An optical multilayer structure for use as a display protector for electronic devices, comprising a base layer, onto which an ink pattern has been provided, and a protective layer laminated thereon, wherein
the base layer is substantially optically transparent, and
the base layer, the protective layer, and ink of the ink pattern are configured so that the ink reflects, when in use, light reaching the structure in higher incidence angles more effectively than light reaching the structure in lower incidence angles, thus rendering the ink pattern more visible in presence of light with higher incidence angles and intensity higher than intensity of light present with lower incidence angles, and transmits light reaching the structure in lower incidence angles more effectively than light reaching the structure in higher incident angles, thus displaying the pattern less clearly in the presence of light with lower incidence angles and intensity higher than intensity of light present with higher incidence angles.

2. The structure of claim 1, wherein the ink is translucent or partially transparent, at predefined wavelengths including wavelengths of visible light.

3. The structure of claim 1, configured such that when in use as a display protector for an electronic device, the ink pattern is less visible when the display is turned on than when the display is off.

4. The structure of claim 1, wherein said ink comprises at least one constituent selected from the group of: silver powder, gloss oil, matt varnish oil, base oil, acrylic acid polymers, isophorone, defoamer, oil-proof agent, dispersant, and thickener.

5. The structure of claim 1, wherein said ink comprises 15-25 percent by weight silver powder.

6. The structure of claim 1, wherein said ink comprises 20-30 percent by weight gloss oil.

7. The structure of claim 1, wherein said ink comprises 40-50 percent by weight matt varnish oil.

8. The structure of claim 1, wherein said ink comprises 5-10 percent by weight base oil.

9. The structure of claim 1, wherein said base layer comprises at least one constituent selected from the group of: acrylic acid and vinyl acetate.

10. The structure of claim 1, additionally comprising an optically substantially transparent adhesive layer.

11. The structure of claim 10, wherein a disposable layer is attached to the adhesive layer and is to be removed prior to attachment to said target entity.

12. The structure of claim 1, wherein said protective layer comprises at least one material selected from the group of: glass, flexible glass, polyethylene terephthalate, polycarbonate, and acrylic.

13. The structure of claim 1, wherein thickness of the structure amounts to under about 0.6 mm.

14. The structure of claim 1, additionally comprising an optically substantially transparent multi-component adhesive.

* * * * *